United States Patent
Xiao et al.

(10) Patent No.: US 12,500,226 B2
(45) Date of Patent: Dec. 16, 2025

(54) FUNCTIONAL HYBRID POWDER AS ADDITIVE FOR ELECTROCHEMICAL CELLS

(71) Applicant: GM GLOBAL TECHNOLOGY OPERATIONS LLC, Detroit, MI (US)

(72) Inventors: Xingcheng Xiao, Troy, MI (US); Mei Cai, Bloomfield Hills, MI (US); Yifan Zhao, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 707 days.

(21) Appl. No.: 17/864,279

(22) Filed: Jul. 13, 2022

(65) Prior Publication Data
US 2024/0021787 A1    Jan. 18, 2024

(51) Int. Cl.
*H01M 4/36* (2006.01)
*H01M 4/58* (2010.01)
(Continued)

(52) U.S. Cl.
CPC ........... *H01M 4/364* (2013.01); *H01M 4/366* (2013.01); *H01M 4/5825* (2013.01);
(Continued)

(58) Field of Classification Search
None
See application file for complete search history.

(56) References Cited

U.S. PATENT DOCUMENTS 10,483,592 B2 * 11/2019 Xiao .................. H01M 50/126
10,615,461 B2    4/2020 Xiao et al.
(Continued)

FOREIGN PATENT DOCUMENTS

CN        103864091 A      6/2014
CN        106025338 A      10/2016
(Continued)

OTHER PUBLICATIONS

Liu, Jin et al., U.S. Appl. No. 16/863,655, filed Apr. 30, 2020, entitled "Solvent-Free Dry Powder Process To Incorporate Ceramic Particles Into Electrochemical Cell Components," 82 pages.
(Continued)

*Primary Examiner* — Zhongqing Wei
(74) *Attorney, Agent, or Firm* — Harness, Dickey & Pierce, P.L.C.

(57) ABSTRACT

A hybrid functional particle for use in an electrochemical cell that cycle lithium ions is provided. The hybrid functional particle includes a lithiated zeolite having a plurality of pores and a plurality of lithium-containing particles disposed within one or more pores of the plurality of pores of the lithiated zeolite. For example, the lithiated zeolite has a porosity ranging from about 10 vol. % to about 90 vol. %, and the lithium-containing particles can fill an amount ranging from about 1% to about 100% of a total porosity of the lithiated zeolite. The electrochemical cell includes first and second electrodes separated by a separating layer, and the hybrid functional particle may be disposed within one or both of the electrodes, coated on one or more sides of one or both of the electrodes, disposed within the separating layer, and/or coated on one or more surfaces of the separating layer.

20 Claims, 7 Drawing Sheets

(51) Int. Cl.
  *H01M 10/0525* (2010.01)
  *H01M 50/434* (2021.01)
  *H01M 50/443* (2021.01)
  *H01M 50/449* (2021.01)
  *H01M 50/491* (2021.01)
  *H01M 4/02* (2006.01)

(52) U.S. Cl.
  CPC ..... *H01M 10/0525* (2013.01); *H01M 50/434* (2021.01); *H01M 50/443* (2021.01); *H01M 50/449* (2021.01); *H01M 50/491* (2021.01); *H01M 2004/021* (2013.01)

(56) References Cited

U.S. PATENT DOCUMENTS

| | | | |
|---|---|---|---|
| 10,950,836 | B2 | 3/2021 | Xiao et al. |
| 11,557,758 | B2 | 1/2023 | Liu et al. |
| 11,936,066 | B2 | 3/2024 | Xiao et al. |
| 2018/0254449 | A1 | 9/2018 | Xiao et al. |
| 2018/0254531 | A1 | 9/2018 | Xiao et al. |
| 2018/0366724 | A1 | 12/2018 | Niina et al. |
| 2019/0229318 | A1 | 7/2019 | Xiao et al. |
| 2020/0062921 | A1* | 2/2020 | Hara .............. C08J 11/08 |
| 2020/0381714 | A1 | 12/2020 | Suzuki |
| 2020/0403204 | A1 | 12/2020 | Xiao et al. |
| 2021/0083294 | A1 | 3/2021 | Xiao et al. |
| 2021/0159493 | A1 | 5/2021 | Xiao et al. |
| 2022/0200039 | A1* | 6/2022 | Xiao .............. H01M 50/491 |
| 2023/0024073 | A1 | 1/2023 | Xiao et al. |
| 2023/0035392 | A1 | 2/2023 | Xiao et al. |

FOREIGN PATENT DOCUMENTS

| | | | |
|---|---|---|---|
| CN | 106384841 | A | 2/2017 |
| CN | 115621663 | A | 1/2023 |
| CN | 115693029 | A | 2/2023 |
| CN | 117410491 | A | 1/2024 |
| DE | 102022109356 | A1 | 1/2023 |
| DE | 102022109657 | A1 | 2/2023 |
| DE | 102023100348 | A1 | 1/2024 |

OTHER PUBLICATIONS

Xiao, Xingcheng et al., U.S. Appl. No. 17/128,905, filed Dec. 21, 2020, entitled "Lithium Battery Including Composite Flame Retardant Particles," 29 pages.

Xiao, Xingcheng et al., U.S. Appl. No. 17/375,414, filed Jul. 14, 2021, entitled "Lithium Ion-Exchanged Zeolite Particles for Electrochemical Cells and Methods of Making the Same," 54 pages.

Xiao, Xingcheng et al.; U.S. Appl. No. 17/390,757, filed Jul. 30, 2021, entitled "Processes for Preparing Functional Particles for Use in Electrochemical Cells and Electrochemical Cells Including Said Functional Particles;" 64 pages.

Xu et al., Multifunctional Lithium-Ion-Exchanged Zeolite-Coated Separator for Lithium-Ion Batteries, Nov. 30, 2018, ACS Applied Energy Materials, 1, 7237-7243 (Year: 2018).

Non-Final Office Action issued Jun. 1, 2023, for U.S. Appl. No. 17/375,414.

Final Office Action issued Sep. 15, 2023, for U.S. Appl. No. 17/375,414.

Non-Final Office Action issued Apr. 17, 2024, for U.S. Appl. No. 17/390,757.

Final Office Action issued Aug. 1, 2024, for U.S. Appl. No. 17/390,757.

* cited by examiner

FUNCTIONAL HYBRID POWDER AS ADDITIVE FOR ELECTROCHEMICAL CELLS

INTRODUCTION

This section provides background information related to the present disclosure which is not necessarily prior art.

Advanced energy storage devices and systems are in demand to satisfy energy and/or power requirements for a variety of products, including automotive products such as start-stop systems (e.g., 12V start-stop systems), battery-assisted systems, hybrid electric vehicles ("HEVs"), and electric vehicles ("EVs"). Typical lithium-ion batteries include at least two electrodes and an electrolyte and/or separator. One of the two electrodes may serve as a positive electrode or cathode and the other electrode may serve as a negative electrode or anode. A separator filled with a liquid or solid electrolyte may be disposed between the negative and positive electrodes. The electrolyte is suitable for conducting lithium ions between the electrodes and, like the two electrodes, may be in solid and/or liquid form and/or a hybrid thereof. In instances of solid-state batteries, which include solid-state electrodes and a solid-state electrolyte (or solid-state separator), the solid-state electrolyte (or solid-state separator) may physically separate the electrodes so that a distinct separator is not required.

SUMMARY

This section provides a general summary of the disclosure, and is not a comprehensive disclosure of its full scope or all of its features.

The present disclosure relates to functional hybrid powder additives for electrochemical cells, to electrodes and electrochemical cells including functional hybrid powder additives, and to methods of making and using the same.

In various aspects, the present disclosure provides a hybrid functional particle for use in an electrochemical cell that cycle lithium ions. The hybrid functional particle may include a lithiated zeolite that includes a plurality of pores and a plurality of lithium-containing particles disposed within one or more pores of the plurality of pores lithiated zeolite. The lithiated zeolite may have a porosity greater than or equal to about 10 vol. % to less than or equal to about 90 vol. %, and the lithium-containing particles may fill greater than or equal to about 1% to less than or equal to about 100% of a total porosity of the lithiated zeolite.

In one aspect, the lithiated zeolite may be defined by a zeolite framework and a plurality of cations dispersed therewithin. The zeolite framework may be selected from the group consisting of: NAT, EDI, THO, ANA, YUG, GOO, MON, HEU, STI, BRE, FAU, MFI, LTL, LTA, and combinations thereof. The cations may include $Li^+$ and/or $NH_4^+$.

In one aspect, the plurality of lithium-containing particles may be selected from the group consisting of: lithium phosphate ($Li_3PO_4$) particles, lithium nitrate ($LiNO_3$) particles, lithium fluoride (LiF), lithium oxide ($Li_2O$), lithium peroxide ($Li_2O_2$), and combinations thereof.

In one aspect, the hybrid functional particle may include greater than or equal to about 5 wt. % to less than or equal to about 40 wt. % of the lithium-containing particles.

In one aspect, the hybrid functional particle may have a particle size greater than or equal to about 100 nanometers to less than or equal about 10 micrometers, and a specific surface area greater than or equal to about 10 $m^2/g$ to less than or equal to about 500 $m^2/g$.

In various aspects, the present disclosure provides an electrode assembly for an electrochemical cell that cycles lithium ions. The electrode assembly may include a current collector, and an electroactive material layer disposed near or adjacent to the current collector. The electroactive material layer may include a plurality of electroactive material particles, and a plurality of hybrid functional particles. Each of the hybrid functional particles may include a lithiated zeolite having a plurality of pores and a plurality of lithium-containing particles disposed within one or more pores of the plurality of pores of the lithiated zeolite. The lithiated zeolite may have a porosity greater than or equal to about 10 vol. % to less than or equal to about 90 vol. %, and the lithium-containing particles may fill greater than or equal to about 1% to less than or equal to about 100% of a total porosity of the lithiated zeolite.

In one aspect, the electroactive material layer may include greater than or equal to about 90 wt. % to less than or equal to about 99.9 wt. % of the electroactive material particles, and greater than or equal to about 0.1 wt. % to less than or equal to about 10 wt. % of the hybrid functional particles.

In one aspect, the lithiated zeolite may be defined by a zeolite framework and a plurality of cations dispersed therewithin. The zeolite framework may be selected from the group consisting of: NAT, EDI, THO, ANA, YUG, GOO, MON, HEU, STI, BRE, FAU, MFI, LTL, LTA, and combinations thereof. The cations may include $Li^+$ and/or $NH_4^+$.

In one aspect, the plurality of lithium-containing particles may be selected from the group consisting of: lithium phosphate ($Li_3PO_4$) particles, lithium nitrate ($LiNO_3$) particles, lithium fluoride (LiF), lithium oxide ($Li_2O$), lithium peroxide ($Li_2O_2$), and combinations thereof.

In one aspect, the hybrid functional particle may include greater than or equal to about 5 wt. % to less than or equal to about 40 wt. % of the lithium-containing particles.

In one aspect, the hybrid functional particle may have a particle size greater than or equal to about 100 nanometers to less than or equal about 10 micrometers, and a specific surface area greater than or equal to about 10 $m^2/g$ to less than or equal to about 500 $m^2/g$.

In one aspect, the plurality of hybrid functional particles may be a first plurality of hybrid functional particles, the lithiated zeolite may be a first lithiated zeolite, the lithium-containing particles may be first lithium-containing particles, and the electrode may further include a protective layer having an average thickness greater than or equal to about 100 nanometers to less than or equal to about 100 micrometers disposed on one or more surfaces of the electroactive material layer. The protective layer may include a second plurality of hybrid functional particles including a second lithiated zeolite having a plurality of pores and a plurality of second lithium-containing particles disposed within one or more pores of the plurality of pores of the second lithiated zeolite. The second lithiated zeolite may have a porosity greater than or equal to about 10 vol. % to less than or equal to about 90 vol. %, and the second lithium-containing particles may fill greater than or equal to about 1% to less than or equal to about 100% of a total porosity of the second lithiated zeolite. The second lithiated zeolite may be the same as or different from the first lithiated zeolite, and the second lithium-containing particles may be the same as or different from the first lithium-containing particles.

In one aspect, the electroactive material layer may have a first surface adjacent to the current collector with a first concentration of the hybrid particles and a second surface opposite from the first surface having a second concentration of the hybrid particles. The first and second concentrations may be different and there may be a gradient of the hybrid functional particles in the electroactive material layer from the first surface to the second surface.

In various aspects, the present disclosure provides an electrochemical cell that cycles lithium ions. The electrochemical cell may include a positive electrode including a plurality of positive electroactive material particles, a negative electrode including a negative electroactive material, and a separating layer disposed between the positive electrode and the negative electrode and having a ceramic coating disposed one or more surfaces of the separating layer. The ceramic coating may include a plurality of hybrid functional particles, each of the hybrid functional particles may have a lithiated zeolite having a plurality of pores and a plurality of lithium-containing particles disposed within one or more pores of the plurality of pores of the lithiated zeolite. The lithiated zeolite may have a porosity greater than or equal to about 10 vol. % to less than or equal to about 90 vol. %, and the lithium-containing particles may fill greater than or equal to about 1% to less than or equal to about 100% of a total porosity of the lithiated zeolite.

In one aspect, the ceramic coating may have an average thickness greater than or equal to about 100 nanometers to less than or equal to about 100 micrometers.

In one aspect, the lithiated zeolite may be defined by zeolite framework and a plurality of cations dispersed therewithin. The zeolite framework may be selected from the group consisting of: NAT, EDI, THO, ANA, YUG, GOO, MON, HEU, STI, BRE, FAU, MFI, LTL, LTA, and combinations thereof. The cations may include $Li^+$ and/or $NH4^+$.

In one aspect, the plurality of lithium-containing particles may be selected from the group consisting of: lithium phosphate ($Li_3PO_4$) particles, lithium nitrate ($LiNO_3$) particles, lithium fluoride (LiF), lithium oxide ($Li_2O$), lithium peroxide ($Li_2O_2$), and combinations thereof.

In one aspect, each of the hybrid functional particles may include greater than or equal to about 5 wt. % to less than or equal to about 40 wt. % of the lithium phosphate ($Li_3PO_4$) particles.

In one aspect, each of the hybrid functional particles may have a particle size greater than or equal to about 100 nanometers to less than or equal about 10 micrometers, and a specific surface area greater than or equal to about 10 m$^2$/g to less than or equal to about 500 m$^2$/g.

In one aspect, the plurality of hybrid functional particles may be a first plurality of hybrid functional particles, the lithiated zeolite may be a first lithiated zeolite, the lithium-containing particles may be first lithium-containing particles, and the positive electrode may further include a second plurality of hybrid functional particles dispersed with the plurality of positive electroactive material particles. The second plurality of hybrid functional particles may include a second lithiated zeolite including a plurality of pores and a plurality of second lithium-containing particles disposed within one or more pores of the plurality of pores of the second lithiated zeolite. The second lithiated zeolite may have a porosity greater than or equal to about 10 vol. % to less than or equal to about 90 vol. %, and the second lithium-containing particles filling greater than or equal to about 1% to less than or equal to about 100% of a total porosity of the second lithiated zeolite. The second lithiated zeolite may be the same as or different from the first lithiated zeolite, and the second lithium-containing particles may be the same as or different from the first lithium-containing particles.

In one aspect, the positive electrode may include greater than or equal to about 90 wt. % to less than or equal to about 99.9 wt. % of the positive electroactive material particles, and greater than or equal to about 0.1 wt. % to less than or equal to about 10 wt. % of the hybrid functional particles.

In one aspect, the plurality of hybrid functional particles may be a first plurality of hybrid functional particles, the lithiated zeolite may be a first lithiated zeolite, the lithium-containing particles may be first lithium-containing particles, and a second plurality of hybrid functional particles may be disposed within the separating layer. The second plurality of hybrid functional particles may include a second lithiated zeolite having a plurality of pores and a plurality of second lithium-containing particles disposed within one or more pores of the plurality of pores of the second lithiated zeolite. The second lithiated zeolite may have a porosity greater than or equal to about 10 vol. % to less than or equal to about 90 vol. %, and the second lithium-containing particles may fill greater than or equal to about 1% to less than or equal to about 100% of a total porosity of the second lithiated zeolite. The second lithiated zeolite may be the same as or different from the first lithiated zeolite, and the second lithium-containing particles may be the same as or different from the first lithium-containing particles.

In one aspect, the separating layer may include greater than or equal to about 20 wt. % to less than or equal to about 97 wt. % of the hybrid functional particles.

Corresponding reference numerals indicate corresponding parts throughout the several views of the drawings.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
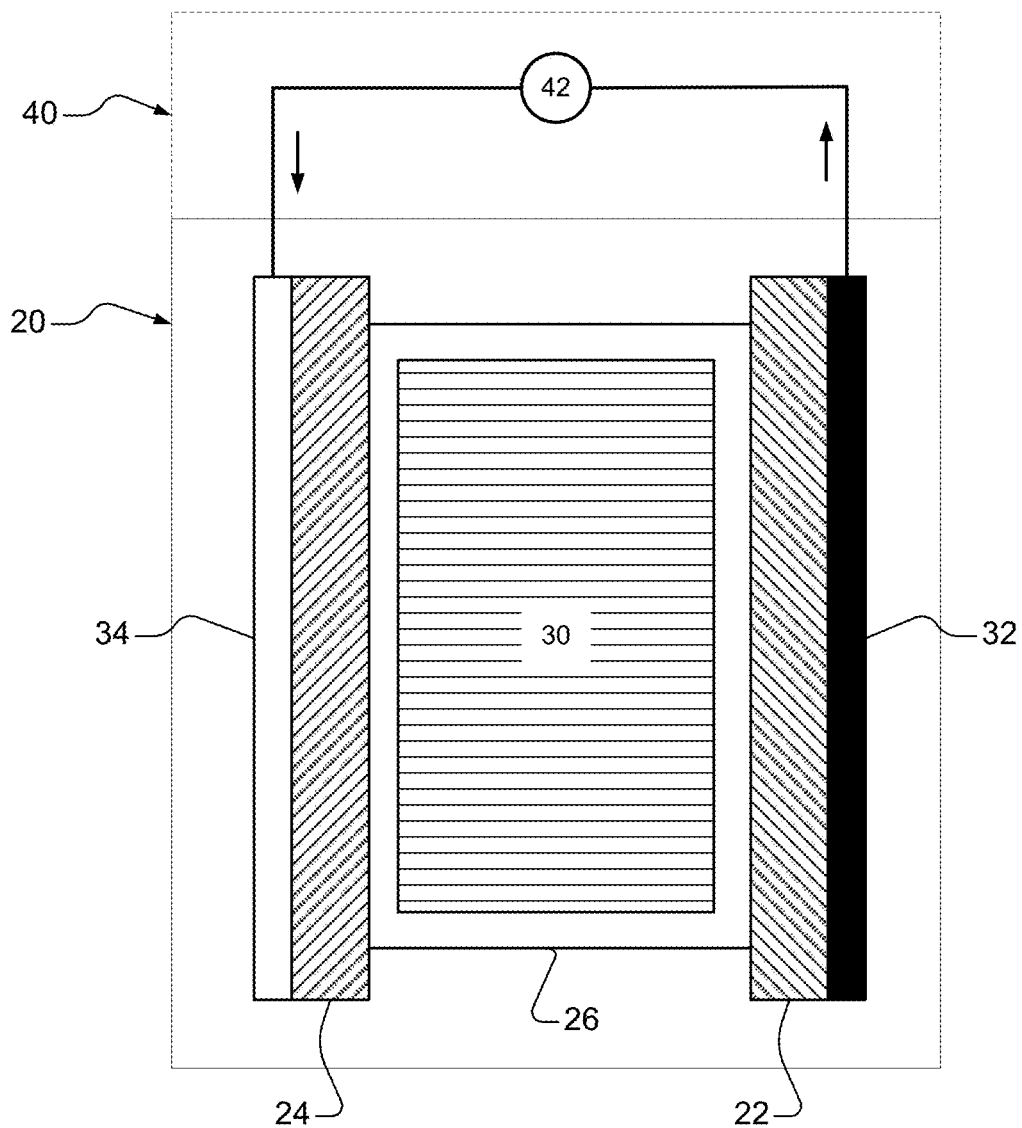
FIG. 1 is a schematic of an example electrochemical battery cell including a functional hybrid powder as an electrode additive in accordance with various aspects of the present disclosure.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected, or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer, or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates both exactly or precisely the stated numerical value, and also, that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present technology relates to electrochemical cells including a functional hybrid powder additive, and also, to methods of forming and using the same. Such cells can be used in vehicle or automotive transportation applications (e.g., motorcycles, boats, tractors, buses, motorcycles, mobile homes, campers, and tanks). However, the present technology may also be employed in a wide variety of other industries and applications, including aerospace components, consumer goods, devices, buildings (e.g., houses, offices, sheds, and warehouses), office equipment and furniture, and industrial equipment machinery, agricultural or farm equipment, or heavy machinery, by way of non-limiting example. Further, although the illustrated examples detail below include a single positive electrode cathode and a single anode, the skilled artisan will recognize that the present teachings also extend to various other configurations, including those having one or more cathodes and one or more anodes, as well as various current collectors with electroactive layers disposed on or adjacent to one or more surfaces thereof.

An exemplary and schematic illustration of an electrochemical cell (also referred to as a battery) 20 is shown in FIG. 1. The battery 20 includes a negative electrode 22 (e.g., anode), a positive electrode 24 (e.g., cathode), and a separator 26 disposed between the two electrodes 22, 24. The separator 26 provides electrical separation—prevents physical contact—between the electrodes 22, 24. The separator 26 also provides a minimal resistance path for internal passage of lithium ions, and in certain instances, related anions, during cycling of the lithium ions. In various aspects, the separator 26 comprises an electrolyte 30 that may, in certain aspects, also be present in the negative electrode 22 and/or the positive electrode 24, so as to form a continuous electrolyte network.

A first current collector 32 (e.g., a negative current collector) may be positioned at or near the negative electrode 22 (which can also be referred to as a negative electroactive material layer). The first current collector 32 together with the negative electrode 22 may be referred to as a negative electrode assembly. Although not illustrated, the skilled artisan will appreciate that, in certain variations, negative electrodes 22 (also referred to as negative electroactive material layers) may be disposed on one or more parallel sides of the first current collector 32. Similarly, the skilled artisan will appreciate that, in other variations, a negative electroactive material layer may be disposed on a first side of the first current collector 32, and a positive electroactive material layer may be disposed on a second side of the first current collector 32. In each instance, the first current collector 32 may be a metal foil, metal grid or screen, or expanded metal comprising copper or any other appropriate electrically conductive material known to those of skill in the art.

A second current collector 34 (e.g., a positive current collector) may be positioned at or near the positive electrode 24 (which can also be referred to as a positive electroactive material layer). The second current collector 34 together with the positive electrode 24 may be referred to as a positive electrode assembly. Although not illustrated, the skilled artisan will appreciate that, in certain variations, positive electrodes 24 (also referred to as positive electroactive material layers) may be disposed on one or more parallel sides of the second current collector 34. Similarly, the skilled artisan will appreciate that, in other variations, a positive electroactive material layer may be disposed on a first side of the second current collector 34, and a negative electroactive material layer may be disposed on a second side of the second current collector 34. In each instance, the second electrode current collector 34 may be a metal foil, metal grid or screen, or expanded metal comprising aluminum or any other appropriate electrically conductive material known to those of skill in the art.

The first current collector 32 and the second current collector 34 may respectively collect and move free electrons to and from an external circuit 40. For example, an interruptible external circuit 40 and a load device 42 may connect the negative electrode 22 (through the first current collector 32) and the positive electrode 24 (through the second current collector 34). The battery 20 can generate an electric current during discharge by way of reversible electrochemical reactions that occur when the external circuit 40 is closed (to connect the negative electrode 22 and the positive electrode 24) and the negative electrode 22 has a lower potential than the positive electrode. The chemical potential difference between the positive electrode 24 and the negative electrode 22 drives electrons produced by a reaction, for example, the oxidation of intercalated lithium, at the negative electrode 22 through the external circuit 40 toward the positive electrode 24. Lithium ions that are also produced at the negative electrode 22 are concurrently transferred through the electrolyte 30 contained in the separator 26 toward the positive electrode 24. The electrons flow through the external circuit 40 and the lithium ions migrate across the separator 26 containing the electrolyte 30 to form intercalated lithium at the positive electrode 24. As noted above, the electrolyte 30 is typically also present in the negative electrode 22 and positive electrode 24. The electric current passing through the external circuit 40 can be harnessed and directed through the load device 42 until the lithium in the negative electrode 22 is depleted and the capacity of the battery 20 is diminished.

The battery 20 can be charged or re-energized at any time by connecting an external power source to the lithium ion battery 20 to reverse the electrochemical reactions that occur during battery discharge. Connecting an external electrical energy source to the battery 20 promotes a reaction, for example, non-spontaneous oxidation of intercalated lithium, at the positive electrode 24 so that electrons and lithium ions are produced. The lithium ions flow back toward the negative electrode 22 through the electrolyte 30 across the separator 26 to replenish the negative electrode 22 with lithium (e.g., intercalated lithium) for use during the next battery discharge event. As such, a complete discharging event followed by a complete charging event is considered to be a cycle, where lithium ions are cycled between the positive electrode 24 and the negative electrode 22. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator.

In many lithium-ion battery configurations, each of the first current collector 32, negative electrode 22, separator 26, positive electrode 24, and second current collector 34 are prepared as relatively thin layers (for example, from several microns to a fraction of a millimeter or less in thickness) and assembled in layers connected in electrical parallel arrangement to provide a suitable electrical energy and power package. In various aspects, the battery 20 may also include a variety of other components that, while not depicted here, are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26. The battery 20 shown in FIG. 1 includes a liquid electrolyte 30 and shows representative concepts of battery operation.

The size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42. Accordingly, the battery 20 can generate electric current to a load device 42 that is part of the external circuit 40. The load device 42 may be powered by the electric current passing through the external circuit 40 when the battery 20 is discharging. While the electrical load device 42 may be any number of known electrically-powered devices, a few specific examples include an electric motor for an electrified vehicle, a laptop computer, a tablet computer, a cellular phone, and cordless power tools or appliances. The load device 42 may also be an electricity-generating apparatus that charges the battery 20 for purposes of storing electrical energy.

With renewed reference to FIG. 1, the positive electrode 24, the negative electrode 22, and the separator 26 may each include an electrolyte solution or system 30 inside their pores, capable of conducting lithium ions between the negative electrode 22 and the positive electrode 24. Any appropriate electrolyte 30, whether in solid, liquid, or gel form, capable of conducting lithium ions between the negative electrode 22 and the positive electrode 24 may be used in the lithium-ion battery 20. For example, in certain aspects, the electrolyte 30 may be a non-aqueous liquid electrolyte solution (e.g., >1 M) that includes a lithium salt dissolved in an organic solvent or a mixture of organic solvents. Numerous conventional non-aqueous liquid electrolyte 30 solutions may be employed in the battery 20.

A non-limiting list of lithium salts that may be dissolved in an organic solvent to form the non-aqueous liquid electrolyte solution include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium bis(trifluoromethane)sulfonylimide ($LiN(CF_3SO_2)_2$), lithium bis(fluorosulfonyl)imide ($LiN(FSO_2)_2$) (LiSFI), and combinations thereof. These and other similar lithium salts may be dissolved in a variety of non-aqueous aprotic organic solvents, including but not limited to, various alkyl carbonates, such as cyclic carbonates (e.g., ethylene carbonate (EC), propylene carbonate (PC), butylene carbonate (BC), fluoroethylene carbonate (FEC), vinylene carbonate (VC), and the like), linear carbonates (e.g., dimethyl carbonate (DMC), diethyl carbonate (DEC), ethylmethylcarbonate (EMC), and the like), aliphatic carboxylic esters (e.g., methyl formate, methyl acetate, methyl propionate, and the like), γ-lactones (e.g., γ-butyrolactone, γ-valerolactone, and the like), chain structure ethers (e.g., 1,2-dimethoxyethane, 1-2-diethoxyethane, ethoxymethoxyethane, and the like), cyclic ethers (e.g., tetrahydrofuran, 2-methyltetrahydrofuran, 1,3-dioxolane, and the like), sulfur compounds (e.g., sulfolane), and combinations thereof.

The porous separator 26 may include, in certain instances, a microporous polymeric separator including a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of polyethylene (PE) and polypropylene (PP), or multi-layered structured porous films of PE and/or PP. Commercially available polyolefin porous separator membranes 26 include CELGARD® 2500 (a monolayer polypropylene separator) and CELGARD® 2320 (a trilayer polypropylene/polyethylene/polypropylene separator) available from Celgard LLC.

When the separator 26 is a microporous polymeric separator, it may be a single layer or a multi-layer laminate, which may be fabricated from either a dry or a wet process. For example, in certain instances, a single layer of the polyolefin may form the entire separator 26. In other aspects, the separator 26 may be a fibrous membrane having an abundance of pores extending between the opposing surfaces and may have an average thickness of less than a millimeter, for example. As another example, however, multiple discrete layers of similar or dissimilar polyolefins may be assembled to form the microporous polymer separator 26. The separator 26 may also comprise other polymers in addition to the polyolefin such as, but not limited to, polyethylene terephthalate (PET), polyvinylidene fluoride (PVdF), a polyamide, polyimide, poly(amide-imide) copolymer, polyetherimide, and/or cellulose, or any other material suitable for creating the required porous structure. The polyolefin layer, and any other optional polymer layers, may further be included in the separator 26 as a fibrous layer to help provide the separator 26 with appropriate structural and porosity characteristics.

In certain aspects, the separator 26 may further include one or more of a ceramic material and a heat-resistant material. For example, the separator 26 may also be admixed with the ceramic material and/or the heat-resistant material, or one or more surfaces of the separator 26 may be coated with the ceramic material and/or the heat-resistant material. In certain variations, the ceramic material and/or the heat-resistant material may be disposed on one or more sides of the separator 26. The ceramic material may be selected from the group consisting of: alumina ($Al_2O_3$), silica ($SiO_2$), and combinations thereof. The heat-resistant material may be selected from the group consisting of: Nomex, Aramid, and combinations thereof.

Various conventionally available polymers and commercial products for forming the separator 26 are contemplated, as well as the many manufacturing methods that may be employed to produce such a microporous polymer separator 26. In each instance, the separator 26 may have an average thickness greater than or equal to about 1 micrometer (μm) to less than or equal to about 50 μm, and in certain instances, optionally greater than or equal to about 1 μm to less than or equal to about 20 μm.

The negative electrode 22 is formed from a lithium host material that is capable of functioning as a negative terminal of a lithium-ion battery. In various aspects, the negative electrode 22 may be defined by a plurality of negative electroactive material particles. Such negative electroactive material particles may be disposed in one or more layers so as to define the three-dimensional structure of the negative electrode 22. The electrolyte 30 may be introduced, for example after cell assembly, and contained within pores of the negative electrode 22. In each instance, the negative electrode 22 (including the one or more layers) may have a thickness greater than or equal to about 0 nanometer (nm) to less than or equal to about 500 μm, optionally greater than or equal to about 1 μm to less than or equal to about 500 μm, and in certain aspects, optionally greater than or equal to about 10 μm to less than or equal to about 200 μm.

In various aspects, negative electrode 22 may include a lithium-containing negative electroactive material, such as a lithium alloy and/or a lithium metal. For example, in certain variations, the negative electrode 22 may be defined by a lithium metal foil. In other variations, the negative electrode 22 may include, for example only, carbonaceous materials (such as, graphite, hard carbon, soft carbon, and the like) and/or metallic active materials (such as tin, aluminum, magnesium, germanium, and alloys thereof, and the like). In further variations, the negative electrode 22 may include a silicon-based electroactive material. In still further variations, the negative electrode 22 may be a composite electrode including a combination of negative electroactive materials. For example, the negative electrode 22 may include a first negative electroactive material and a second negative electroactive material. In certain variations, a ratio of the first negative electroactive material to the second negative electroactive material may be greater than or equal to about 5:95 to less than or equal to about 95:5. The first negative electroactive material may be a volume-expanding material including, for example, silicon, aluminum, germanium, and/or tin. The second negative electroactive material may include a carbonaceous material (e.g., graphite, hard carbon, and/or soft carbon) For example, in certain variations, the negative electroactive material may include a carbonaceous-silicon based composite including, for example, about 10 wt. % $SiO_x$ (where $0 \leq x \leq 2$) and about 90 wt. % graphite. In each instance, the negative electroactive material may be prelithiated.

In certain variations, the negative electroactive material may be optionally intermingled (e.g., slurry casted) with an electronically conductive material (i.e. conductive additive) that provide an electron conductive path and/or a polymeric binder material that improve the structural integrity of the negative electrode 22. For example, the negative electrode 22 may include greater than or equal to about 30 wt. % to less than or equal to about 98 wt. %, and in certain aspects, optionally greater than or equal to about 60 wt. % to less than or equal to about 95 wt. %, of the negative electroactive material; greater than or equal to 0 wt. % to less than or equal to about 30 wt. %, and in certain aspects, optionally greater than or equal to about 0.5 wt. % to less than or equal to about 10 wt. %, of the electronically conducting material; and greater than or equal to 0 wt. % to less than or equal to about 20 wt. %, and in certain aspects, optionally greater than or equal to about 0.5 wt. % to less than or equal to about 10 wt. %, of the polymeric binder.

Example polymeric binders include polyimide, polyamic acid, polyamide, polysulfone, polyvinylidene difluoride (PVdF), polytetrafluoroethylene (PTFE), polyacrylic acid (PAA), blends of polyvinylidene fluoride and polyhexafluoropropene, polychlorotrifluoroethylene, ethylene propylene diene monomer (EPDM) rubber, carboxymethyl cellulose (CMC), nitrile butadiene rubber (NBR), styrene-butadiene rubber (SBR), lithium polyacrylate (LiPAA), sodium polyacrylate (NaPAA), sodium alginate, and/or lithium alginate. Electronically conducting materials may include, for example, carbon-based materials, powdered nickel or other metal particles, or a conductive polymer. Carbon-based materials may include, for example, particles of graphite, acetylene black (such as KETCHEN™ black or DENKA™ black), carbon nanofibers and nanotubes (e.g., single wall carbon nanotubes (SWCNT), multiwall carbon nanotubes (MWCNT)), graphene (e.g., graphene platelets (GNP), oxidized graphene platelets), conductive carbon blacks (such as, SuperP (SP)), and the like. Examples of a conductive polymer include polyaniline, polythiophene, polyacetylene, polypyrrole, and the like.

The positive electrode 24 is formed from a lithium-based active material that is capable of undergoing lithium intercalation and deintercalation, alloying and dealloying, or plating and stripping, while functioning as the positive terminal of a lithium-ion battery. The positive electrode 24 can be defined by a plurality of electroactive material particles. Such positive electroactive material particles may be disposed in one or more layers so as to define the three-dimensional structure of the positive electrode 24. In certain variations, the positive electrode 24 may also include a plurality of functional hybrid particles disposed with the positive electroactive material particles. For example, the positive electrode 24 may include greater than or equal to about 0 wt. % to less than or equal to about 10 wt. %, and in certain aspects, optionally greater than or equal to about 0.1 wt. % to less than or equal to about 5 wt. %, of functional hybrid particles having an average particle size greater than or equal to about 100 nm to less than or equal about 10 μm. The small amount of functional hybrid particles ensures that the electrode additive has minimal impact on electrode design and energy density. In certain variations, the functional hybrid particles may be uniformly dispersed in the positive electrode 24. In other variation, the functional hybrid particles may be disposed to form a gradient, where areas of the positive electrode 24 closer to the positive electrode current collector 34 have greater amounts of the functional hybrid particles as compared to areas of the positive electrode 24 further from the positive electrode current collector 34. The electrolyte 30 may be introduced, for example after cell assembly, and contained within pores or voids of the positive electrode 24 defined between the positive electroactive material particles and the functional hybrid particles (and optionally the conductive additive and/or polymeric binder). In each instance, the positive electrode 24 may have an average thickness greater than or equal to about 1 μm to less than or equal to about 500 μm, and in certain aspects, optionally greater than or equal to about 10 μm to less than or equal to about 200 μm.

In various aspects, the positive electroactive material (also referred to as cathode active materials (CAM)) includes a layered oxide represented by $LiMeO_2$, where Me is a transition metal, such as cobalt (Co), nickel (Ni), manganese (Mn), iron (Fe), aluminum (Al), vanadium (V), or combinations thereof. In other variations, the positive electroactive material includes an olivine-type oxide represented by $LiMePO_4$, where Me is a transition metal, such as cobalt (Co), nickel (Ni), manganese (Mn), iron (Fe), aluminum (Al), vanadium (V), or combinations thereof. In still other variations, the positive electroactive material includes a monoclinic-type oxide represented by $Li_3Me_2(PO_4)_3$, where Me is a transition metal, such as cobalt (Co), nickel (Ni), manganese (Mn), iron (Fe), aluminum (Al), vanadium (V), or combinations thereof. In still other variations, the positive electroactive material includes a spinel-type oxide represented by LiMe$_2$O$_4$, where Me is a transition metal, such as cobalt (Co), nickel (Ni), manganese (Mn), iron (Fe), aluminum (Al), vanadium (V), or combinations thereof. In still other variations, the positive electroactive material includes a tavorite represented by LiMeSO$_4$F and/or LiMePO$_4$F, where Me is a transition metal, such as cobalt (Co), nickel (Ni), manganese (Mn), iron (Fe), aluminum (Al), vanadium (V), or combinations thereof. In still further variations, the positive electroactive material includes a combination of positive electroactive materials. For example, the positive electrode 24 may include one or more layered oxides, one or more olivine-type oxides, one or more monoclinic-type oxides, one or more spinel-type oxide, one or more tavorite, or combinations thereof.

In various aspects, each of the functional hybrid particles includes a lithium ion-exchanged zeolite particle (i.e., lithiated zeolite) having, for example, a plurality of lithium-containing particles disposed within one or more of the pores or cages defined within the lithium ion-exchange zeolite particle. In certain variations, the plurality of particles may include lithium phosphate (Li$_3$PO$_4$) particles, lithium nitrate (LiNO$_3$) particles, lithium fluoride (LiF), lithium oxide (Li$_2$O), lithium peroxide (Li$_2$O$_2$), and combinations thereof. The individual lithium ion-exchange zeolite particle may have porosities greater than or equal to about 10 vol. % to less than or equal to about 90 vol. %, and in certain aspects, optionally porosities greater than or equal to about 30 vol. % to less than or equal to about 80 vol. %, and the lithium-containing articles may fill greater than or equal to about 1% to less than or equal to about 100%, and in certain aspects, optionally greater than or equal to about 30% to less than or equal to about 70%, of the total porosity of the individual lithium ion-exchange zeolite particle. The pores of the lithium ion-exchange zeolite particle may also retain the electrolyte 30 so as to aid with lithium ion migration, reducing cell impedance.

In certain variations, the functional hybrid particles may additionally or alternatively include lithium-containing particles present at an exterior surface of the lithium ion-exchange zeolite particle. In each instance, the functional hybrid particles may include a weight ratio of the lithium ion-exchange zeolite particle to lithium-containing particles of greater than or equal to about 99:1 to less than or equal to about 1:99, and in certain aspects, optionally greater than or equal to about 80:20 to less than or equal to about 20:80. During cycling, the lithium-containing particles may move out of (i.e., released from) the pores of the lithium ion-exchanged zeolite particles and disposed on one or more surface of the positive electrode 24 so as to form a cathode electrolyte interphase (CEI) layer (for example, via precipitation) that protects the positive electroactive materials and improves ionic conductivity.

The lithium ion-exchanged zeolite particles may comprise or consist essentially of particles of one or more natural or synthetic zeolite materials. The term "zeolite" refers to a synthetic or natural crystalline material having a porous framework structure built from tetrahedra atoms (e.g., silicon, aluminum, phosphorus) connected by bridging oxygen atoms. For example, zeolites can include a three-dimensional framework of alumina (AlO$_2$) and silica (SiO$_2$) tetrahedral units and extra-framework cations. Each tetrahedral unit introduces one negative charge to the framework that is offset by the extra-framework cations. The extra-framework cations may be organic or inorganic in nature.

As used herein, the term "lithium ion-exchanged zeolite particle" means a zeolite that has been ion-exchanged with lithium ions such that a plurality of lithium ions (Li$^+$) is present within the zeolite as free ions and/or as the extra-framework ions. For example, in various aspects, the lithium ion-exchanged zeolite particles may comprise a three-dimensional framework of alumina (AlO$_2$) and silica (SiO$_2$) tetrahedral units and extra-framework lithium cations (Li$^+$). The amount of extra-framework lithium cations present in the lithium ion-exchanged zeolite particles at least partially depend on the silicon to aluminum (Si:Al) ratio of the specific zeolite material and the cation exchange capacity (CEC) of the zeolite material. For example, the lithium ion-exchanged zeolite particles may comprise particles of a zeolite material having a SiO$_2$:Al$_2$O$_3$ ratio in the range of greater than or equal to about 10 to less than or equal to about 50, optionally greater than or equal to about 10 to less than or equal to about 40, optionally greater than or equal to about 10 to less than or equal to about 20, optionally greater than or equal to about 20 to less than or equal to about 50, and in certain aspects, optionally greater than or equal to about 30 to less than or equal to about 50. In certain variations, lithium ion-exchanged zeolite particles with more SiO$_2$ compared to Al$_2$O$_3$, for example, having a SiO$_2$:Al$_2$O$_3$ ratio greater than about 10, may be preferred, for example, to increased stability. In other variations, lithium ion-exchanged zeolite particles with more Al$_2$O$_3$ compared to SiO$_2$, for example, having a SiO$_2$:Al$_2$O$_3$ ratio less than about 10, may be provided, for example, so as to help increased hydrofluoric acid (HF) scavenger function. In each instance, the lithium ion-exchanged zeolite particles defining the functional hybrid particles may include greater than or equal to about 90 atomic % (at. %), optionally greater than or equal to about 95 at. %, optionally greater than or equal to 99 at. %, or in certain aspects, optionally about 100 at. %, of the extra-framework cations (e.g., lithium cations (Li$^+$)) in the zeolite particles.

In each instance, the zeolite framework has voids or pores in the form of cages or channels between the tetrahedra, which are defined by rings of interconnected oxygen (O), silicon (Si), phosphorus (P) and/or aluminum (Al) atoms. The zeolite particles may have an average pore diameter less than or equal to about 1.5 nm, optionally less than or equal to about 1 nm, optionally less than or equal to about 0.75 nm, optionally less than or equal to about 0.5 nm, optionally less than or equal to about 0.25 nm, optionally less than or equal to about 0.1 nm, or in certain aspects, optionally about 0.05 nm. Additionally, or alternatively, the zeolite particles may have an average pore diameter greater than or equal to about 0.1 nm to less than or equal to about 1.5 nm, optionally greater than or equal to about 0.1 nm to less than or equal to about 1 nm, or in certain aspects, optionally greater than or equal to about 0.35 nm to less than or equal to about 0.7 nm. Zeolite materials having pore openings with widths or diameters as described above may include zeolite materials having pore openings defined by 8-membered, 9-membered, 10-membered, and/or 12-membered rings. The lithium-containing particles may have an average particle size less than the average particle size that is less than the average pore diameter of the pores of the zeolite particles. For example, the lithium-containing particles may have an average particle size greater than or equal to about 0.5 nm to less than or equal to about 1 µm, and in certain aspects, optionally greater than or equal to about 1 nm to less than or equal to about 100 nm. The lithium-containing particles must be able to be impregnatable into the pores of the zeolite. Thus, the particle size of the lithium-containing particles must be less than the pore size of the zeolite.

As noted, the lithiated zeolite particle may have a crystal structure including a plurality of interstitial spaces (or cages)

of molecular dimensions, as such the lithiated zeolite particle can be used as an adsorbent to selectively adsorb molecules by retaining the molecules (in addition to the lithium-containing particles) within its interstitial spaces. Access to the interstitial spaces within the lithiated zeolite particle can be provided by pore openings (or channels) in the crystal lattice of the lithiated zeolite particle, which are, for example, defined by rings of interconnected oxygen (O), silicon (Si), and/or aluminum (Al) atoms. The size and shape of these pore openings limit the size and shape of the molecules that can be adsorbed by the lithiated zeolite particle and are determined, at least in part, by the number of tetrahedral units (or, alternatively, oxygen atoms) that make up the rings and by the type of extra-framework cations present within the lithiated zeolite particle. For example, in certain variations, the lithium-exchanged zeolite particle may have an average pore size diameter such that it can be used to selectively absorbing water molecules (e.g., trace amounts) from the liquid electrolyte, without adsorbing the organic solvent molecules or the lithium salt ions in the electrolyte solution in the electrolyte. For example, the lithium ion-exchanged zeolite particles may have an average pore size diameter larger than the ionic radius of water ($H_2O$), but less than the ionic radius of the organic solvent molecules in the electrolyte solution.

Further, in certain variations, as a result of the high surface area (e.g., greater than or equal to about 10 $m^2/g$ to less than or equal to about 500 $m^2/g$) of the lithium-exchanged zeolite particle, the alumina ($AlO_2$) and silica ($SiO_2$) can scavenge and react with hydrofluoric acid (HF), which is highly corrosive and often generated by electrochemical cells during electrolyte decomposition, for example, by the reaction of lithium hexafluorophosphate ($LiPF_6$) with water (e.g., $LiPF_6+H_2O \leftrightarrow LiF+POF_3+2HF$). The dispersion of the functional hybrid particles with the positive electroactive materials in the positive electrode 24 may help to improve the scavenging function of the lithium-exchange zeolite particles, since the functional hybrid particles are near to the positive electroactive materials and able to react with the hydrofluoric acid before it attacks the positive electroactive materials. In each instance, trapping trace water (thereby limiting the formation of the hydrofluoric acid), and also the scavenging and trapping of formed hydrofluoric acid, can help to reduce corrosion and degradation of the various components of the battery 20. Further still, in certain variations, the lithium-exchanged zeolite particle may trap transition metal ions (e.g., $Mn^{2+}$ and/or $Fe^{2+/3+}$), which may be present in the electrolyte 30 as a result of decomposition of lithium-based intercalation host materials within the positive electrode 24 and/or due to the presence of transition metal impurities in the positive electrode 24, via ion exchange.

With renewed reference to FIG. 1, in certain variation, the positive electroactive material may also be optionally intermingled (e.g., slurry casted) with an electronically conductive material (i.e. conductive additive) that provide an electron conductive path and/or a polymeric binder material that improve the structural integrity of the positive electrode 24. For example, the positive electrode 24 may include greater than or equal to about 30 wt. % to less than or equal to about 98 wt. %, and in certain aspects, optionally greater than or equal to about 60 wt. % to less than or equal to about 97 wt. %, of the positive electroactive material; greater than or equal to 0 wt. % to less than or equal to about 30 wt. %, and in certain aspects, optionally greater than or equal to about 0.5 wt. % to less than or equal to about 10 wt. %, of the electronically conducting material; and greater than or equal to 0 wt. % to less than or equal to about 20 wt. %, and in certain aspects, optionally greater than or equal to about 0.5 wt. % to less than or equal to about 10 wt. %, of the polymeric binder. The conductive additive and/or binder material as included in the positive electrode 24 may be the same as or different from the conductive additive as included in the negative electrode 22.

Figure 2:
FIG. 2 is a schematic of an example electrode having an electrode coating that includes a functional hybrid powder in accordance with various aspects of the present disclosure.

In other variations, as illustrated in FIG. 2, a protective layer 100 including a plurality of functional hybrid particles, like the functional hybrid particles detailed in the content of FIG. 1, and optionally a polymeric binder, may be disposed on one or more surfaces of a positive electrode 124. For example, although not illustrated, it should be recognized that the protective layer 100 may be disposed on a surface of the positive electrode 124 that opposes a separating layer. Similarly, although not illustrated, it should be recognized that in addition to the protective layer 100 and the first plurality of functional hybrid particles included therein, a second plurality of functional hybrid particles may also be dispersed with the positive electroactive materials in the positive electrode 124. In each instance, the protective layer 100 may have a thickness greater than or equal to about 100 nm to less than or equal to about 100 µm, and in certain aspects, optionally greater than or equal to about 1 µm to less than or equal to about 10 µm.

Figure 3:
FIG. 3 is a schematic of an example separator having a ceramic coating that includes a functional hybrid powder in accordance with various aspects of the present disclosure.

In still other variations, as illustrated in FIG. 3, a ceramic layer 200 including a plurality of functional hybrid particles, like the functional hybrid particles detailed in the content of FIG. 1, may be disposed on one or more surfaces of a separator 226, which is incorporated into a cell to physically separate electrodes. For example, although not illustrated, it should be recognized that the ceramic layer 200 may be disposed on a surface of the separator that opposed a positive electrode. Similarly, although not illustrated, it should be recognized that in addition to the ceramic layer 200 and the first plurality of functional hybrid particles included therein, a second plurality of functional hybrid particles may also be dispersed within the separating layer 226. For example, the separating layer 226 may include greater than or equal to about 5 wt. % to less than or equal to about 100 wt. %, and in certain aspects, optionally greater than or equal to about 80 wt. % to less than or equal to about 95 wt. %, of the second plurality of functional hybrid particles. In each instance, the ceramic layer 200 may have a thickness greater than or equal to about 100 nm to less than or equal to about 100 µm, and in certain aspects, optionally greater than or equal to about 1 µm to less than or equal to about 10 µm; and a porosity greater than or equal to about 10 vol. % to less than or equal to about 80 vol. %, and in certain aspects, optionally greater than or equal to about 30 vol. % to less than or equal to about 60 vol. %. In certain variations, the ceramic layer 200 may include one or more binders (e.g., aqueous binders and/or organic solvent-based binders) dispersed with the plurality of functional hybrid particles.

It should be recognized, that in still further variations, although not illustrated, a separating layer may be provided that includes a plurality of functional hybrid particles dispersed therein (e.g., greater than or equal to about 50 wt. % to less than or equal to about 99 wt. %, and in certain aspects, optionally greater than or equal to about 80 wt. % to less than or equal to about 90 wt. %, of the functional hybrid particles), but is not coated with a ceramic layer that also includes functional hybrid particles.

Figure 4:
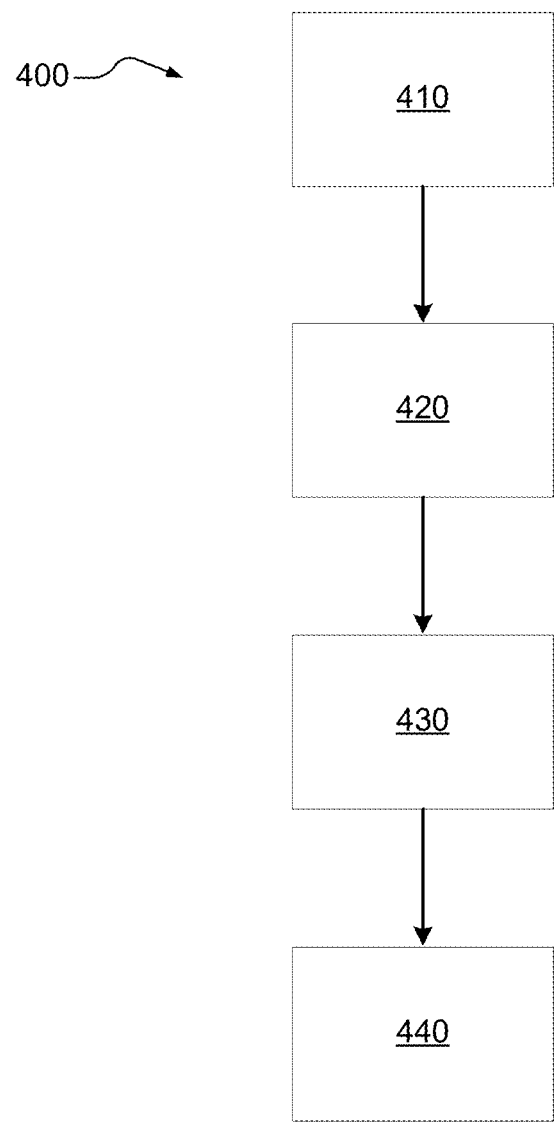
FIG. 4 is a flowchart illustrating an example method for forming a functional hybrid powder such as can be incorporated in an electrode as an electrode additive, coated on one or more surfaces of an electrode, incorporated in a separating layer as a separator additive, and/or coated on one or more surfaces of a separating layer in accordance with various aspects of the present disclosure.

In various aspects, the present disclosure provides methods for forming a functional hybrid powder, such as detailed above, which can be incorporated in an electrode as an electrode additive, coated on one or more surfaces of an electrode, incorporated in a separating layer as a separator additive, and/or coated on one or more surfaces of a separating layer. the functional hybrid powder may be prepared using methods like those detailed in U.S. patent application Ser. No. 17/375,414, titled "Lithium Ion-Exchange Zeolite Particles for Electrochemical Cells and Methods of Making the Same", to Xingcheng Xiao and Mei Cai, filed Jul. 14, 2021, the entire disclosure of which is hereby incorporated by reference. For example, as illustrated in FIG. 4, and example method 400 for forming a functional hybrid powder may include contacting 410 a precursor zeolite powder, including a plurality of precursor zeolite particles having exchangeable extra-framework cations, with a phosphate solution to from a first admixture.

The phosphate solution may be a non-aqueous or aqueous solution including, for example, $(NH_4)_3PO_4$, $Na_3PO_4$, $K_3PO_4$, $Na_2HPO_4$, $KH_2PO_4$, $Ca_3(PO_4)_2$, $Ba_3(PO_4)_2$, and combinations thereof. The precursor zeolite particles may include a framework selected from NAT, EDI, THO, ANA, YUG, GOO, MON, HEU, STI, BRE, FAU, MFI, LTL, and/or LTA. For example, in certain variations, the precursor zeolite particles may include a zeolite material such as zeolite A, zeolite Y, zeolite L, and/or ZSM-5. In each variation, the precursor zeolite particles may include initial exchangeable cations selected from hydrogen, ammonium, lithium, sodium, potassium, rubidium, cesium, francium, beryllium, magnesium, calcium, strontium, barium, and/or radium.

The zeolite powder and the phosphate solution may be contacted, for example, mixed, within a first container, at a sufficient temperature (e.g., greater than or equal to about 18° C. to less than or equal to about 150° C.) for a sufficient amount of time (e.g., greater than or equal to about 5 minutes to less than or equal to about 48 hours) such that at least some of the exchangeable extra-framework cations (e.g., $Na^+$, $H^+$, $K^+$) of the precursor zeolite powder are exchange with, for example, $NH_4^+$ ions, of the phosphate solution to form intermediate zeolite particles.

Although not illustrated, in certain variations, the method 400 may include preparing the phosphate solution and/or obtaining the precursor zeolite powder. In each variation, the method 400 may further include contacting 420 a lithium salt to the first admixture such that at least some of the exchangeable extra-framework cations (e.g., $NH_4^+$, $Na^+$, $H^+$, $K^+$) of the intermediate zeolite particles are replaced or exchanged with $Li^+$ ions to form functional hybrid particles, as detailed above. In certain variations, the first admixture and the lithium salt may be contacted, for example, mixed within the first container, at a sufficient temperature (e.g., greater than or equal to about 18° C. to less than or equal to about 150° C.) for a sufficient amount of time (e.g., greater than or equal to about 5 minutes to less than or equal to about 48 hours)

The lithium salt may include, for example, lithium hydroxide (LiOH), lithium carbonate ($Li_2CO_3$), lithium chloride (LiCl), lithium nitrate ($LiNO_3$), and/or lithium sulfate ($Li_2SO_4$). In certain variations, the lithium salt may be present in an aqueous or non-aqueous solution (i.e., solvent solution) and the intermediate zeolite particles may undergo mixing with the lithium salt. The concentration of the lithium salt in the solution may be in the range of 0.1 M to 2 M and may be adjusted during the lithium ion-exchange method to ensure a sufficient amount of the initial exchangeable cations in the intermediate zeolite particles is replaced with lithium ions, for example, $NH_4^+$ cations replaced with $Li^+$ cations. The addition of a lithium salt to the first mixture can be represented by the exemplary reaction equation (1) below:

$$3LiOH+(NH_4)_3PO_4=Li_3PO_4\downarrow+3NH_3\uparrow+3H_2O \qquad (1)$$

As detailed above, the $Li_3PO_4$ formed during the reaction can be present within the cages of the lithium ion-exchanged zeolite particles and/or present on exterior surfaces the lithium ion-exchanged zeolite particles. The concentrations of the $(NH_4)_3PO_4$ and/or the lithium salt (e.g., LiOH) can be adjusted, based on the amount of cations in the precursor zeolite material, so as to ensure that $Li_3PO_4$ forms inside the cages or voids of the zeolite particles and/or on exterior surfaces the lithium ion-exchanged zeolite particles.

By first exchanging the extra framework cations (e.g., $Na^+$, $H^+$, $K^+$), for example, with a smaller hydrated radius, within the precursor zeolite particles with $NH_4^+$ cations (e.g., in step 410), the $NH_4^+$ cations can then be more readily and easily exchanged with $Li^+$ cations (e.g., in step 420). Removal of undesirable cations, such as $Na^+$ and $K^+$, from the zeolite particles is beneficial because such undesirable cations can cause contamination in the electrolyte of the battery. Furthermore, incorporation of $Li_3PO_4$ in the zeolite particles is advantageous because $Li_3PO_4$ has fire retardant properties and can help prevent a fire during a thermal runaway event for the battery.

In certain variations, the method 400 may further include, following the ion exchange, separating 430 the functional hybrid particles from any residual solvents. The functional hybrid particles may be separated 430 form the residual solvent(s) using any suitable method including, for example, by centrifuge or filtering. Similarly, the functional hybrid particles may be cleaned or washed by removing residual ions and solvent therefrom, for example, by being washed with deionized water.

In certain variations, the method 400 may further include heating 440 the isolated the functional hybrid particles at a suitable temperature for a sufficient amount of time to remove adsorbed water therefrom. For example, the functional hybrid particles may be calcined in a dry environment or in a vacuum to accelerate the water removal process. For example, the functional hybrid particles may be calcined in an environment having less than 20% relative humidity. In each instance, the functional hybrid particles may be heated 440 to a temperature greater than or equal to about 400° C. to less than or equal to about 1000° C., and in certain aspects, optionally greater than or equal to about 500° C. to less than or equal to about 800° C., for a period greater than or equal to about 30 minutes to less than or equal to about 8 hours, an in certain aspects, optionally greater than or equal to about 2 hours to less than or equal to about 4 hours.

Certain features of the current technology are further illustrated in the following non-limiting examples.

Example 1

Example batteries and battery cells may be prepared in accordance with various aspects of the present disclosure. For example, an example cell 510 may include an electrode additive comprising a plurality of functional hybrid particles. In certain variations, the electrode additive may be included in a positive electrode. A first comparative cell 520 may include an electrode additive (for example, in a positive electrode) comprising lithiated zeolite. A second comparative cell 530 may omit the electrode additives. Each of the cells 510, 520, 530 includes a positive electroactive material comprising a lithium nickel manganese cobalt aluminum oxide (NMCA).

Figure 5A:
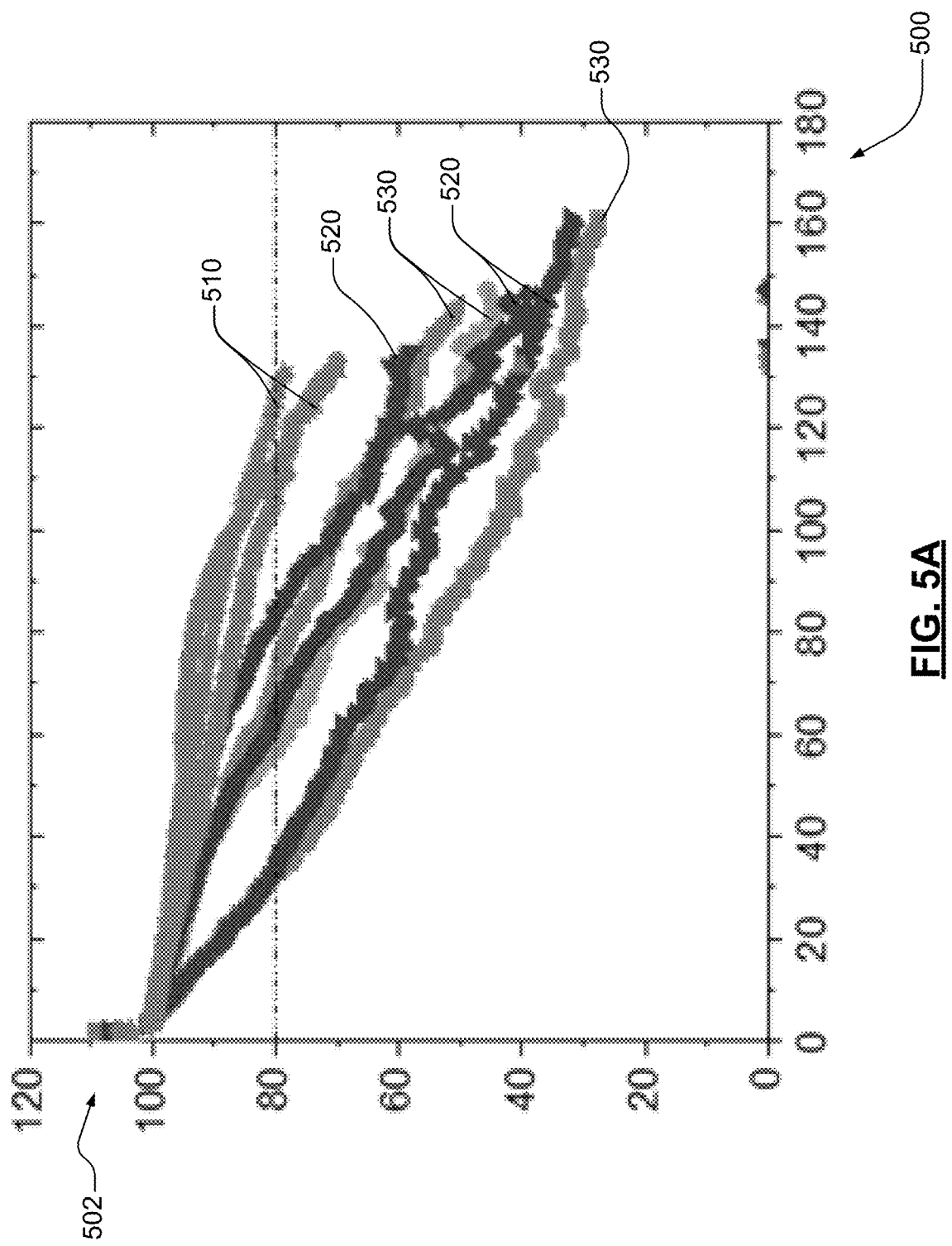
FIG. 5A is a graphical illustration demonstrating the capacity retention of an example cell including a functional hybrid powder as an electrode additive in accordance with various aspects of the present disclosure.

FIG. 5A is a graphical illustration demonstrating the capacity retention of the example cell 510 as compared to the comparative cells 520, 530 (C/5 charge, C/2 discharge, 50° C.), where the x-axis 500 represents cycle number, and the y-axis 502 represents capacity retention (%). As illustrated, the example cell 510 has improved capacity retention as compared to the comparative cells 520, 530.

Figure 5B:
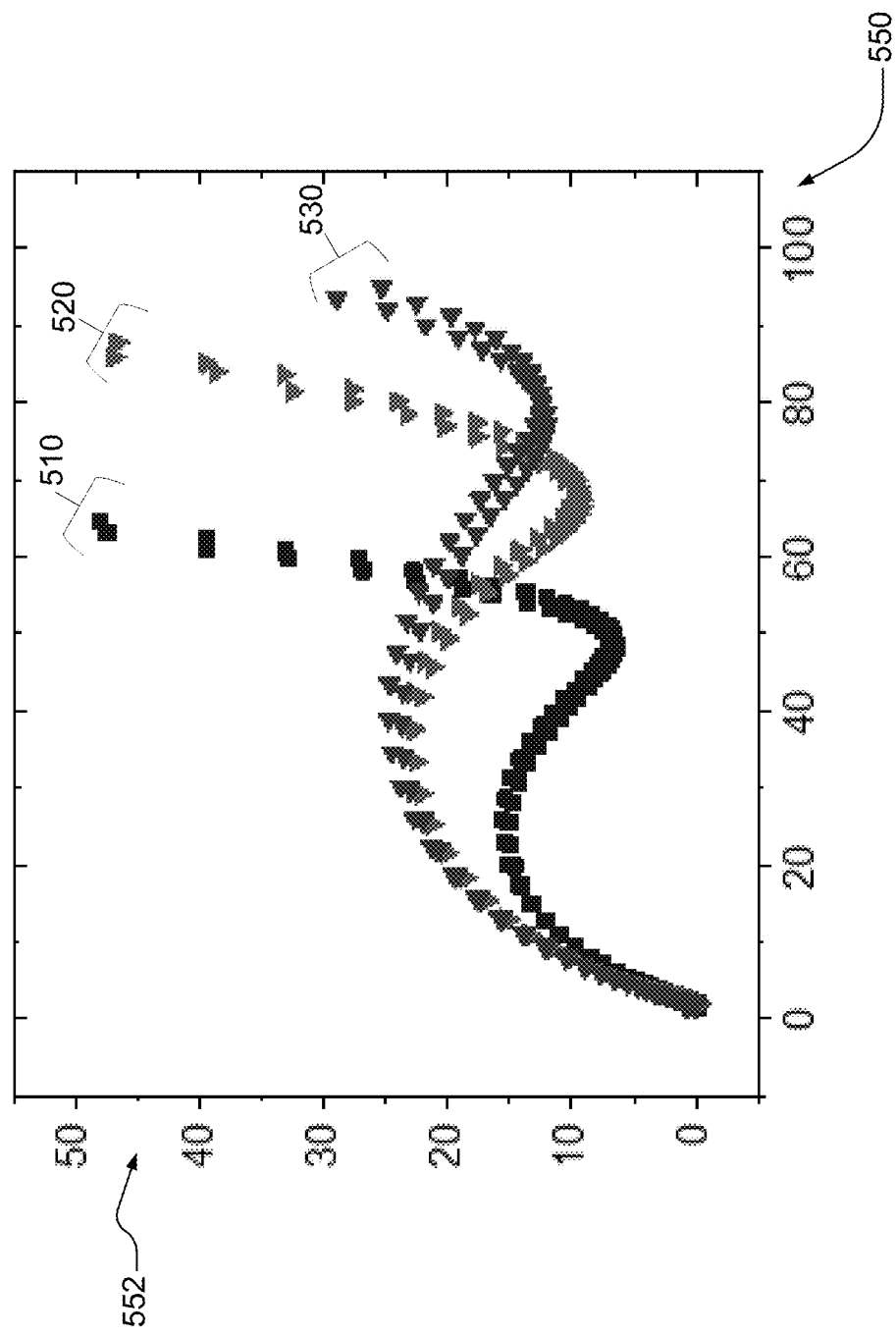
FIG. 5B is a graphical illustration demonstrating the cell impedance, after cell assembly, of an example cell including a functional hybrid powder as an electrode additive in accordance with various aspects of the present disclosure.

FIG. 5B is a graphical illustration demonstrating the cell impedance of the example cell 510 as compared to the comparative cells 520, 530 after cell assembly, where the x-axis 550 represents real part of impedance (Re(Z)/ohm), and the y-axis 552 represents imaginary part of impedance (−Im(Z)/ohm). As illustrated, the example cell 510 has reduced cell impedance after cell assembly as compared to the comparative cells 520, 530.

Figure 5C:
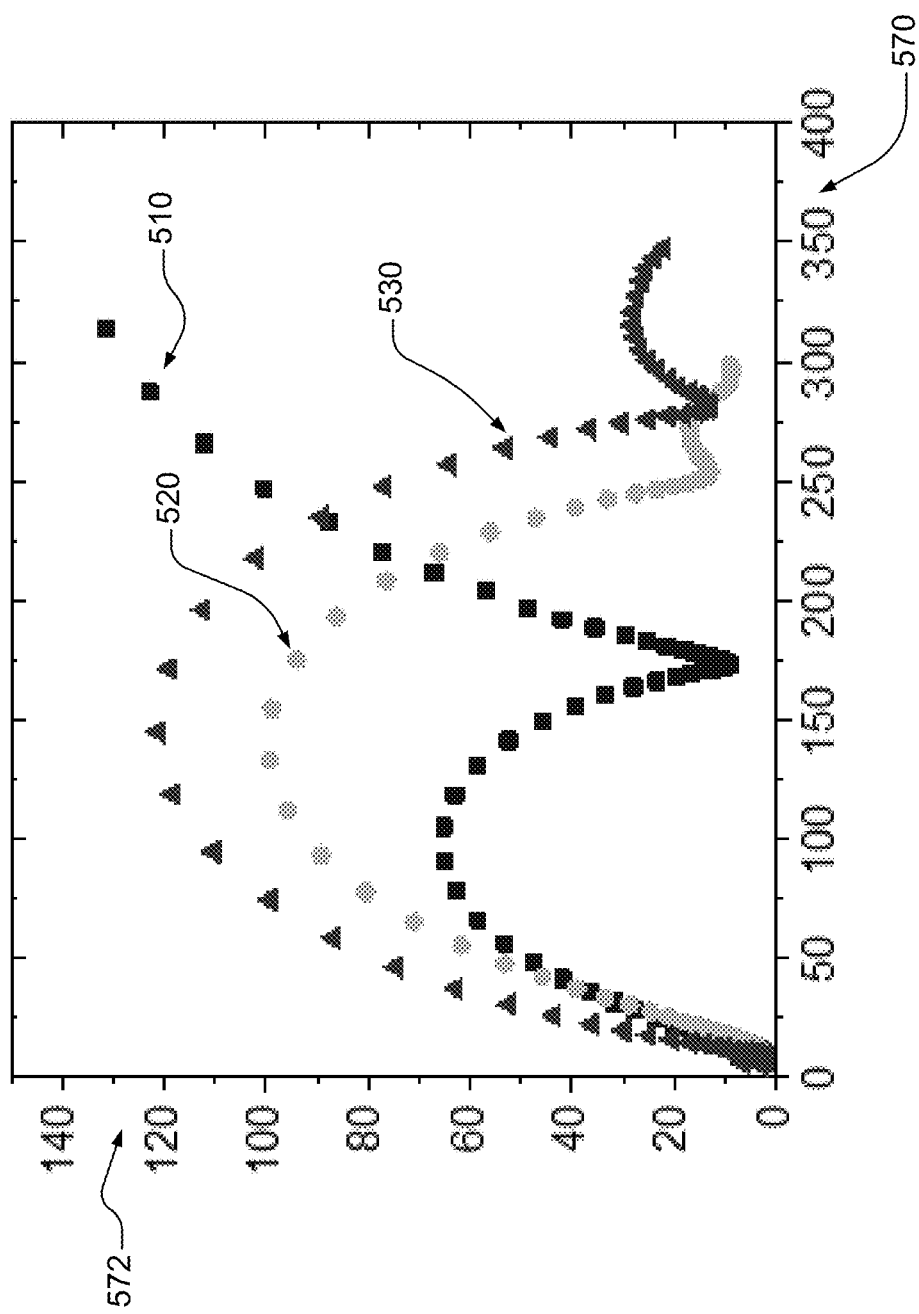
FIG. 5C is a graphical illustration demonstrating the cell impedance, after 140 cycles, of an example cell including a functional hybrid powder as an electrode additive in accordance with various aspects of the present disclosure.

FIG. 5C is a graphical illustration demonstrating the cell impedance of the example cell 510 as compared to the comparative cells 520, 530 after 140 cycles, where the x-axis 570 represents real part of impedance (Re(Z)/ohm), and the y-axis 572 represents imaginary part if impedance (−Im(Z)/ohm). As illustrated, the example cell 510 has reduced cell impedance after 140 cycles as compared to the comparative cells 520, 530.

Example 2

Example batteries and battery cells may be prepared in accordance with various aspects of the present disclosure. For example, an example cell 610 may include a coating layer comprising a plurality of functional hybrid particles disposed on one or more sides of a separating layer. In certain variations, the coating layer may be disposed on a surface of the separating layer opposing a positive electrode. A first comparative cell 620 may include a coating layer comprising a lithiated zeolite disposed on one or more sides of a separating layer. A second comparative cell 630 may include a ceramic layer comprising, for example, $Al_2O_3$, zeolite disposed on one or more sides of a separating layer. In each instance, the positive electrodes may include, for example, NMC 622, and the negative electrodes separated from the positive electrodes by the separating layers may include graphite.

Figure 6:
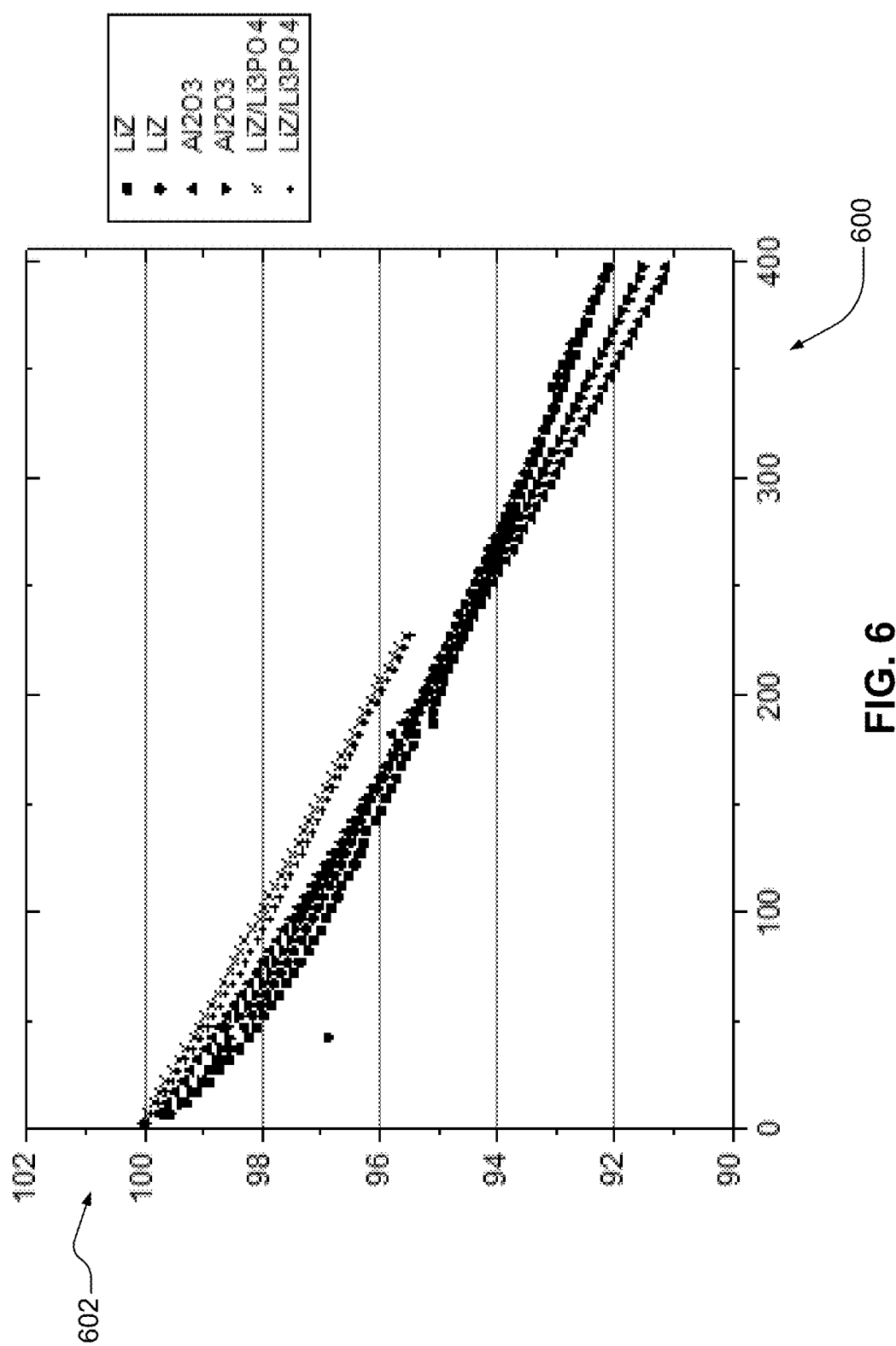
FIG. 6 is a graphical illustration demonstrating the capacity retention of an example cell including a separating layer having a ceramic coating that includes a functional hybrid powder in accordance with various aspects of the present disclosure.

FIG. 6 is a graphical illustration demonstrating the capacity retention of the example cell 610 as compared to comparative cells 620 and 630 at 45° C., where the x-axis 600 represents cycle number, and the y-axis 602 represents capacity retention (%). As illustrated, the example cell 620 has improved capacity retention as compared to the comparative cells 620, 630.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A hybrid functional particle for use in an electrochemical cell that cycle lithium ions, the hybrid functional particle comprising:

a lithiated zeolite comprising a plurality of pores and having a porosity greater than or equal to 10 vol. % to less than or equal to 90 vol. %; and a plurality of lithium-containing particles disposed within one or more pores of the plurality of pores of the lithiated zeolite, the lithium-containing particles filling greater than or equal to 1% to less than or equal to 100% of a total porosity of the lithiated zeolite, the plurality of lithium-containing particles selected from the group consisting of: lithium nitrate, lithium fluoride, lithium oxide, lithium peroxide, and combinations thereof.

2. The hybrid functional particle of claim 1, wherein the lithiated zeolite is defined by a zeolite framework and a plurality of cations dispersed therewithin, the zeolite framework being selected from the group consisting of: NAT, EDI, THO, ANA, YUG, GOO, MON, HEU, STI, BRE, FAU, MFI, LTL, LTA, and combinations thereof, the cations comprising $Li^+$ and $NH_4^+$.

3. The hybrid functional particle of claim 1, comprising greater than or equal to 5 wt. % to less than or equal to 40 wt. % of the lithium-containing particles.

4. The hybrid functional particle of claim 1, having a particle size greater than or equal to 100 nanometers to less than or equal 10 micrometers, and a specific surface area greater than or equal to 10 $m^2/g$ to less than or equal to 500 $m^2/g$.

5. An electrode assembly for an electrochemical cell that cycles lithium ions, the electrode assembly comprising:

a current collector; and an electroactive material layer disposed on the current collector, the electroactive material layer comprising:

a plurality of electroactive material particles; and a plurality of hybrid functional particles, each of the hybrid functional particles having:

a lithiated zeolite comprising a plurality of pores and with a porosity greater than or equal to 10 vol. % to less than or equal to 90 vol. %; and a plurality of lithium-containing particles disposed within one or more pores of the plurality of pores of the lithiated zeolite, the lithium-containing particles filling greater than or equal to 1% to less than or equal to 100% of a total porosity of the lithiated zeolite, the plurality of lithium-containing particles for at least one of the hybrid functional particles of the plurality of hybrid functional particles being selected from the group consisting of: lithium nitrate, lithium fluoride, lithium oxide, lithium peroxide, and combinations thereof.

6. The electrode assembly of claim 5, wherein the electroactive material layer comprises:

greater than or equal to 90 wt. % to less than or equal to 99.9 wt. % of the electroactive material particles, and greater than or equal to 0.1 wt. % to less than or equal to 10 wt. % of the hybrid functional particles;

the hybrid functional particle comprises greater than or equal to 5 wt. % to less than or equal to 40 wt. % of the lithium-containing particles; and the hybrid functional particle has a particle size greater than or equal to 100 nanometers to less than or equal 10 micrometers, and a specific surface area greater than or equal to 10 $m^2/g$ to less than or equal to 500 $m^2/g$.

7. The electrode assembly of claim 5, wherein the lithiated zeolite is defined by a zeolite framework and a plurality of cations dispersed therewithin, the zeolite framework being selected from the group consisting of: NAT, EDI, THO, ANA, YUG, GOO, MON, HEU, STI, BRE, FAU, MFI, LTL, LTA, and combinations thereof, the cations comprising $Li^+$ and $NH_4^+$.

8. The electrode assembly of claim 5, wherein the plurality of hybrid functional particles is a first plurality of hybrid functional particles, the lithiated zeolite is a first lithiated zeolite, the lithium-containing particles are first lithium-containing particles, and the electrode further comprises:
   a protective layer having an average thickness greater than or equal to 100 nanometers to less than or equal to 100 micrometers disposed on one or more surfaces of the electroactive material layer, the protective layer comprising a second plurality of hybrid functional particles, the second plurality of hybrid functional particles having:
      a second lithiated zeolite comprising a plurality of pores and with a porosity greater than or equal to 10 vol. % to less than or equal to 90 vol. %, the second lithiated zeolite being the same as or different from the first lithiated zeolite; and
      a plurality of second lithium-containing particles disposed within one or more pores of the plurality of pores of the second lithiated zeolite, the second lithium-containing particles filling greater than or equal to 1% to less than or equal to 100% of a total porosity of the second lithiated zeolite, the second lithium-containing particles being the same as or different from the first lithium-containing particles.

9. The electrode assembly of claim 5, wherein the electroactive material layer has a first surface disposed on the current collector with a first amount of the hybrid particles and a second surface opposite from the first surface having a second amount of the hybrid particles, wherein the first and second amounts are different and there is a gradient of the hybrid functional particles in the electroactive material layer from the first surface to the second surface.

10. An electrochemical cell that cycles lithium ions, the electrochemical cell comprising:
   a positive electrode comprising a plurality of positive electroactive material particles;
   a negative electrode comprising a negative electroactive material; and
   a separating layer disposed between the positive electrode and the negative electrode and having a ceramic coating disposed one or more surfaces of the separating layer, the ceramic coating comprising:
      a plurality of hybrid functional particles, each of the hybrid functional particles having:
         a lithiated zeolite comprising a plurality of pores and with a porosity greater than or equal to 10 vol. % to less than or equal to 90 vol. %; and
         a plurality of lithium-containing particles disposed within one or more pores of the plurality of pore of the lithiated zeolite, the lithium-containing particles filling greater than or equal to 1% to less than or equal to 100% of a total porosity of the lithiated zeolite, the plurality of lithium-containing particles for at least one of the hybrid functional particles of the plurality of hybrid functional particles being selected from the group consisting of: lithium nitrate, lithium fluoride, lithium oxide, lithium peroxide, and combinations thereof.

11. The electrochemical cell of claim 10, wherein the ceramic coating has an average thickness greater than or equal to 100 nanometers to less than or equal to 100 micrometers.

12. The electrochemical cell of claim 10, wherein the lithiated zeolite is defined by zeolite framework and a plurality of cations dispersed therewithin, the zeolite framework being selected from the group consisting of: NAT, EDI, THO, ANA, YUG, GOO, MON, HEU, STI, BRE, FAU, MFI, LTL, LTA, and combinations thereof, the cations comprising $Li^+0$ and $NH4^+$.

13. The electrochemical cell of claim 12, wherein each of the hybrid functional particles further comprises greater than or equal to 5 wt. % to less than or equal to 40 wt. % of the lithium phosphate particles.

14. The electrochemical cell of claim 10, wherein each of the hybrid functional particles has a particle size greater than or equal to 100 nanometers to less than or equal 10 micrometers, and a specific surface area greater than or equal to 10 $m^2/g$ to less than or equal to 500 $m^2/g$.

15. The electrochemical cell of claim 10, wherein the plurality of hybrid functional particles is a first plurality of hybrid functional particles, the lithiated zeolite is a first lithiated zeolite, the lithium-containing particles are first lithium-containing particles, and the positive electrode further comprises:
   a second plurality of hybrid functional particles dispersed with the plurality of positive electroactive material particles, the second plurality of hybrid functional particles having:
      a second lithiated zeolite comprising a plurality of pores and with a porosity greater than or equal to 10 vol. % to less than or equal to 90 vol. %, the second lithiated zeolite being the same as or different from the first lithiated zeolite; and
      a plurality of second lithium-containing particles disposed within one or more pores of the plurality of pores of the second lithiated zeolite, the second lithium-containing particles filling greater than or equal to 1% to less than or equal to 100% of a total porosity of the second lithiated zeolite, the second lithium-containing particles being the same as or different from the first lithium-containing particles.

16. The electrochemical cell of claim 15, wherein the positive electrode comprises:
   greater than or equal to 90 wt. % to less than or equal to 99.9 wt. % of the positive electroactive material particles; and
   greater than or equal to 0.1 wt. % to less than or equal to 10 wt. % of the hybrid functional particles.

17. The electrochemical cell of claim 10, wherein the plurality of hybrid functional particles is a first plurality of hybrid functional particles, the lithiated zeolite is a first lithiated zeolite, the lithium-containing particles are first lithium-containing particles, and a second plurality of hybrid functional particles are disposed within the separating layer, the second plurality of hybrid functional particles having:
   a second lithiated zeolite comprising a plurality of pores and with a porosity greater than or equal to 10 vol. % to less than or equal to 90 vol. %, the second lithiated zeolite being the same as or different from the first lithiated zeolite; and
   a plurality of second lithium-containing particles disposed within one or more pores of the plurality of pores of the second lithiated zeolite, the second lithium-containing particles filling greater than or equal to 1% to less than or equal to 100% of a total porosity of the second lithiated zeolite, the second lithium-containing particles being the same as or different from the first lithium-containing particles.

18. The electrochemical cell of claim 17, wherein the separating layer includes greater than or equal to 20 wt. % to less than or equal to 97 wt. % of the hybrid functional particles.

19. The hybrid functional particle of claim 1, wherein the plurality of lithium-containing particles is a first plurality of lithium-containing particles and the hybrid functional particle further comprises:
   a second plurality of lithium-containing particles disposed within the one or more mores of the plurality of pores of the lithiated zeolite, the second plurality of lithium-containing particles comprising lithium phosphate particles.

20. The hybrid functional particle of claim 1, wherein the lithiated zeolite is defined by a zeolite framework and a plurality of cations dispersed therewithin, the zeolite framework being selected from the group consisting of: THO, MON, and combinations thereof.

* * * * *